United States Patent [19]
Kawakami

[11] Patent Number: 5,743,236
[45] Date of Patent: Apr. 28, 1998

[54] FUEL INJECTION CONTROL SYSTEM FOR INTERNAL COMBUSION ENGINE

[75] Inventor: Takeshi Kawakami, Hyogo, Japan

[73] Assignee: Mitsubishi Denki Kabushiki Kaisha, Tokyo, Japan

[21] Appl. No.: 764,396

[22] Filed: Dec. 11, 1996

[30] Foreign Application Priority Data

May 30, 1996 [JP] Japan ................................ 8-136598

[51] Int. Cl.$^6$ ........................................ F02D 41/04
[52] U.S. Cl. ........................................ 123/491
[58] Field of Search .............................. 123/491, 435, 123/436

[56] References Cited

U.S. PATENT DOCUMENTS

| | | | |
|---|---|---|---|
| 4,137,871 | 2/1979 | Martel et al. | 123/491 |
| 4,495,927 | 1/1985 | Yamato | 123/491 |
| 4,681,079 | 7/1987 | Kaneta | 123/491 |
| 5,024,082 | 6/1991 | Ohukubo et al. | 73/117.3 |

FOREIGN PATENT DOCUMENTS 7-166919  6/1995  Japan ........................ F02D 41/04

*Primary Examiner*—Willis R. Wolfe
*Assistant Examiner*—Hieu T. Vo
*Attorney, Agent, or Firm*—Sughrue, Mion, Zinn, Macpeak & Seas, PLLC

[57] ABSTRACT

A fuel injection control system for an internal combustion engine comprises: start mode detecting means for detecting when the internal combustion engine is in a start mode; non-combustion detecting means for detecting the non-combustion state of the internal combustion engine; and correcting means for correctively increasing the valve opening time of the fuel injection valve when the internal combustion engine is in the start mode and in non-combustion state. Hence, the system is able to start the internal combustion engine quickly even when fuel is scarcely present in the fuel flow path.

6 Claims, 5 Drawing Sheets

REVOLUTION
SENSOR SIGNAL
T(n-1)　T(n)

FUEL INJECTION CONTROL SYSTEM FOR INTERNAL COMBUSION ENGINE

BACKGROUND OF THE INVENTION

This invention relates to a fuel injection control system of an internal combustion engine, and more particularly to an improvement in startability of the internal combustion engine.

In general, when an automobile has been assembled on an automobile assembling line in an automobile manufacturing factory, the automobile is started and run by itself so that it is removed out of the automobile assembling line. In this case, it is required to start the engine and to remove the automobile from the automobile assembling line within a predetermined time, for example, only about twenty (20) seconds.

Hence, if the internal combustion engine is not started because of its unsatisfactory startability, then it is impossible to allow the automobile to run by itself to go out of the automobile assembling line. In this case, the worker must push the automobile so that the latter goes out of the automobile assembling line. This greatly lowers the productivity of the automobile.

However, immediately after the automobile has been assembled, the fuel supply line is not filled with fuel yet, and therefore even if the fuel injection valves are opened, no fuel is supplied thereto; that is, the automobile is low in startability. This is due to the following reason: With the key switch turned on, the fuel pump operates to pump fuel out of the fuel tank, so that the fuel line from the fuel tank to the pressure regulator is filled with fuel; however, in this case, the fuel line from the pressure regulator to the injector is not filled with fuel yet; however, no fuel is injected through the injector until the injector is opened to discharge the air from that fuel supply line.

By the way, Japanese Unexamined Patent Publication 7-166919 has disclosed a fuel supply system in which the fuel line from the pressure regulator to the injector is relatively long; however, the fuel supply system thus disclosed suffers from the above-described problem more greatly.

That is, in a system which controls a fuel injection quantity by electronic control, the pressure of fuel to be injected is maintained constant with respect to the pressure in the intake pipe. This function is performed by the pressure regulator adapted to regulate the fuel pressure. The pressure regulator further operates to return the fuel to the fuel tank through a fuel line called "a return pipe" which a surplus fuel provided when the fuel pressure is regulated. Hence, it is necessary to lay a long return pipe between the fuel tank and the pressure regulator provided near the internal combustion engine. What is proposed by the aforementioned JP-A-7-166919 is the fuel system in which the return pipe is shortened, and the pressure regulator is provided near the fuel tank.

In the fuel system, it is true that the return pipe is shortened; however, the fuel line between the pressure regulator and the injector is lengthened. Therefore, when the automobile assembling work has been accomplished, a large quantity of air is present in the fuel line, which further increase the time of period which elapses until fuel is injected by the injector.

However, heretofore no means for solving the above-described problem is provided, which lower the work efficiency in the manufacture of automobiles.

SUMMARY OF THE INVENTION

Accordingly, an object of the invention is to solve the above-described problem.

An object of the invention is to provide a fuel injection control system for an internal combustion engine which is able to start an internal combustion engine quickly even when fuel is scarcely present in the fuel line.

Another object of the invention is to provide a fuel injection control system for an internal combustion engine which is simple in arrangement and is able to start an internal combustion engine quickly even when fuel is scarcely present in the fuel line.

A further object of the invention is to improve the reliability of a fuel injection control system for an internal combustion engine which is able to start an internal combustion engine quickly even when fuel is scarcely present in the fuel line.

A still further object of the invention is to simplify the operation of a fuel injection control system for an internal combustion engine which is able to start an internal combustion engine quickly even when fuel is scarcely present in the fuel line.

The foregoing objects and other objects of the invention have been achieved by the provision of a fuel injection control system for an internal combustion engine which, according to the invention, comprises: a fuel tank which stores fuel which is supplied to the internal combustion engine; a fuel pump which pumps the fuel out of the fuel tank; fuel pressure regulating means for regulating the pressure of fuel supplied from the fuel pump; a fuel flow path with its one end connected to the fuel pressure regulating means, to supply the fuel the pressure of which has been regulated; a fuel injection valve which is connected to the other end of the fuel flow path, to inject fuel into the internal combustion engine; start mode detecting means for detecting when the internal combustion engine is in a start mode; non-combustion detecting means for detecting a non-combustion state of the internal combustion engine; and correcting means for correctively increasing the valve opening time of the fuel injection valve when the internal combustion engine is in the start mode and in non-combustion state.

In the fuel injection control system, the non-combustion detecting means may indirectly or directly detect the non-combustion state of the internal combustion engine.

The injection control system may further comprises: start-completion detecting means for detecting when the internal combustion engine has been started; power supplying means for supplying electric power by utilizing the electric power of a battery even after a power switch is turned off; memory means for storing the fact, even after the power switch is turned off, that the internal combustion engine has been started, the memory means being kept energized by the power supplying means; and inhibiting means for inhibiting the operation of the correcting means when the fact has been stored that the internal combustion engine has been started.

The nature, utility and principle of the invention will be more clearly understood from the following detailed description and the appended claims when read in conjunction with the accompanying drawing.

DETAILED DESCRIPTION OF THE PREFERRED EMBODIMENTS

Preferred embodiments of the invention will be described with reference to the accompanying drawings.

First Embodiment

Figure 1:
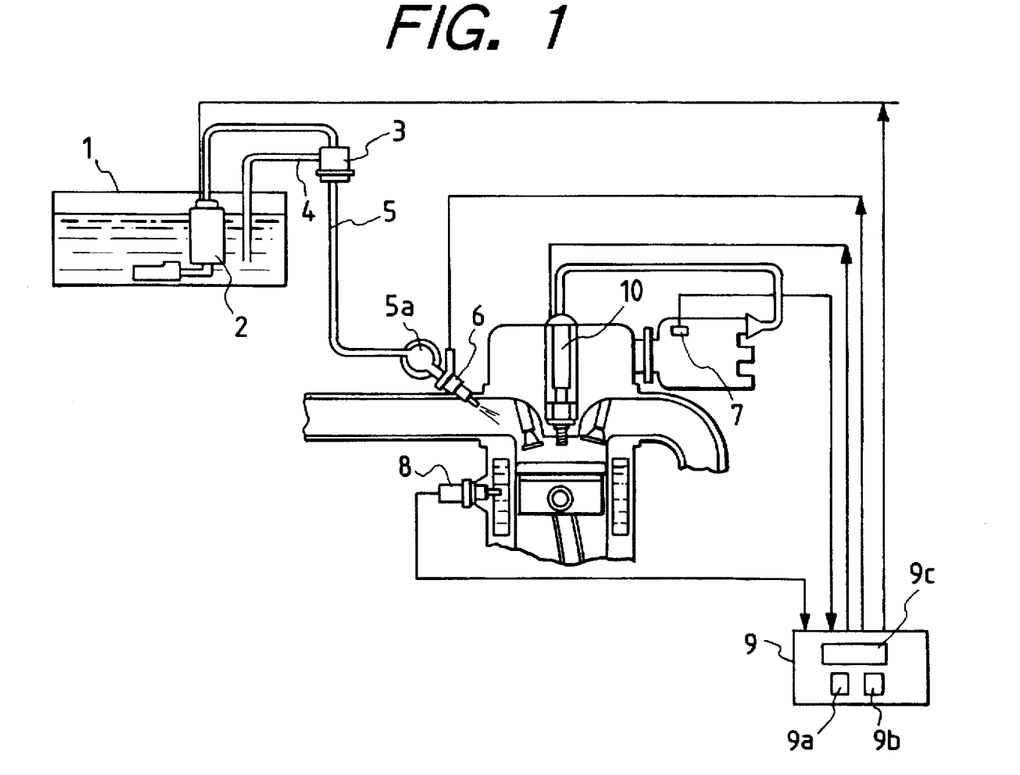
FIG. 1 is an explanatory diagram showing the arrangement of an example of a fuel injection control system for an internal combustion engine, which constitutes a first embodiment of the invention.

An example of a fuel injection control system for an internal combustion engine, which constitutes a first embodiment of the invention, is as shown in FIG. 1.

In FIG. 1, reference numeral 1 designates a fuel tank which stores fuel which is supplied to an internal combustion engine; 2, a fuel pump which pumps fuel out of the fuel tank 1, and pressurizes the fuel to supply it to the internal combustion engine; 3, fuel pressure regulating means, namely, a pressure regulator which receives fuel from the fuel pump and regulates the pressure of the fuel, the pressure regulator being provided near the fuel tank 1; 4, a return pipe which forms a path through which a surplus fuel is returned to the fuel tank which is formed when the pressure regulator 3 regulates the pressure of the fuel as was described above; and 5, a fuel flow path, namely, a fuel pipe through which the fuel flows the pressure of which has been regulated. One end of the fuel pipe 5 is connected to the pressure regulator 3, and the other end is formed into a delivery pipe 5a.

Further in FIG. 1, reference numeral 6 designates a fuel injection valve, or an injector, connected to the delivery pipe 5a, the injector being protruded into the intake pipe of the internal combustion engine, to inject fuel in response to a drive signal from an ECU 9 (described later); 7, a revolution sensor for detecting the number of revolutions per minute (or the speed of rotation) of the internal combustion engine; and 8, a water temperature sensor for detecting the temperature of a cooling water in the internal combustion engine. The detection signals of those sensors 7 and 8, for instance, together with the detection signal of an intake-pipe pressure sensor adapted to detect the pressure in the intake pipe are applied to the ECU 9. The ECU 9, receiving data on the number of revolutions per minutes (rpm) of the engine, the water temperature, the intake pipe pressure, and the suction air quantity, calculates the quantity of fuel necessary for the internal combustion engine, and controls the fuel pump 2, the injector 6, and an ignition plug 10. The ECU 9 comprises: a random access memory (RAM) 9A which stores and renews data which are supplied from various sensors and control states of the internal combustion engine; a read-only memory (ROM) 9b in which various control programs and control data have been stored; and a central processing unit (CPU) 9c which performs various calculations and various controls according to control programs stored in the ROM 9b.

Figure 2:
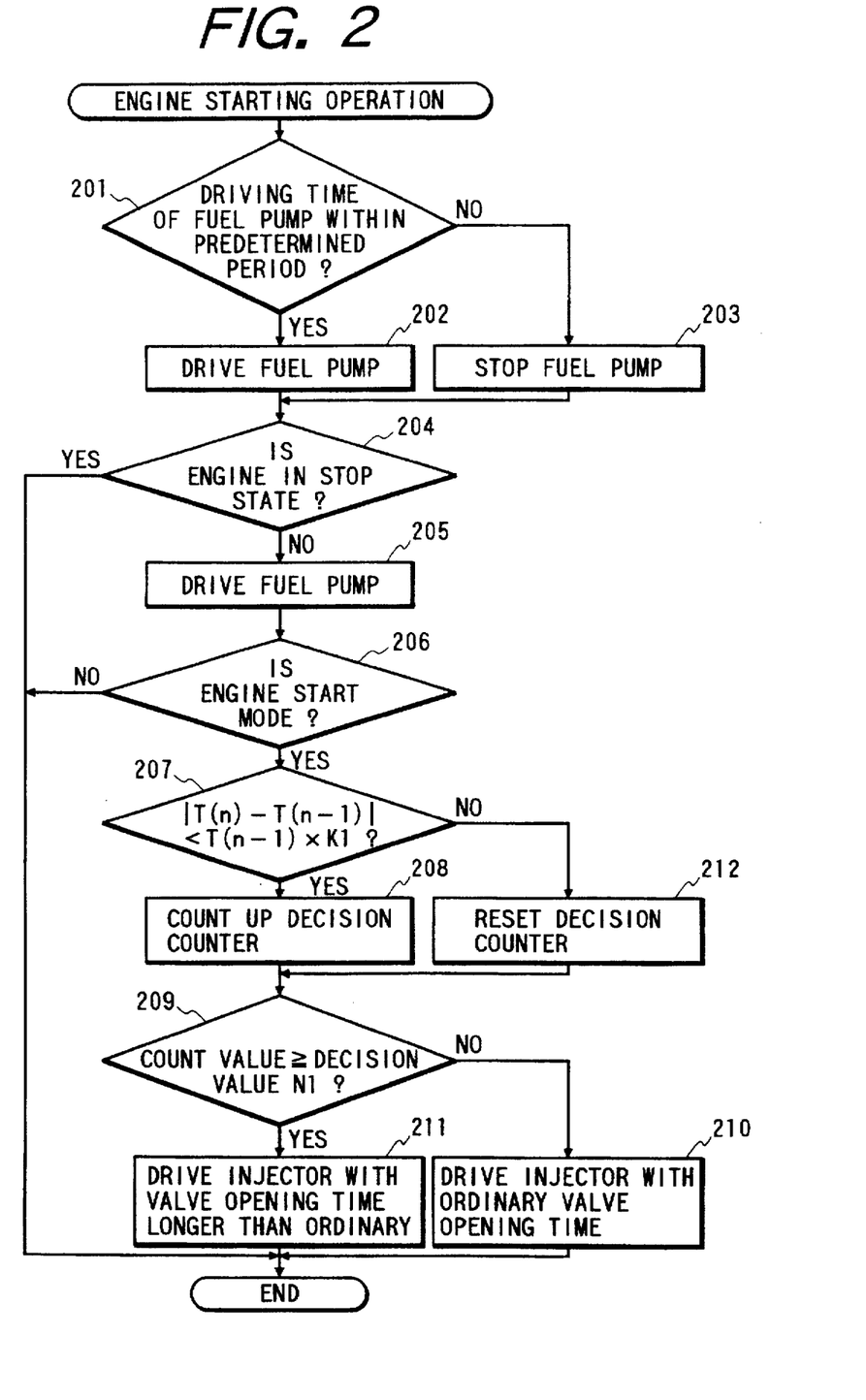
FIG. 2 is a flow chart for a description of the operating steps of the fuel injection control system shown in FIG. 1.

FIG. 2 is a flow chart for a description of the operating steps of the above-described first embodiment. Those operating steps are in a main routine, and repeatedly performed after a power switch, namely, a key switch is turned on.

Roughly stated, in those operating steps, it is determined whether or not the internal combustion engine is in a start mode and in non-combustion state; and when it is determined that the engine is in the start mode and in non-combustion state, it is decided that the fuel line is filled with air instead of fuel, so that, and the valve open time of the injector is made longer than in the ordinary operation of the engine thereby to accelerate the discharging of air out of the fuel pipe.

In the flow chart of FIG. 2, Steps 201 through 203 are operations for filling the fuel pipe up to the pressure regulator 3 (inclusive) with fuel. Even when the key switch is turned on, the starter is not immediately started; that is, when the operation of Steps 203 is accomplished, the starter is started. This is because, even if the fuel pump 2 is started, it will take a certain period of time to fill the fuel line up with fuel.

When the key switch is turned on, the system is started according to the flow chart of FIG. 2. That is, in Step 201, it is determined whether or not the driving time of the fuel pump 2 is within a predetermined period of time. Immediately after the key switch is turned, it is determined that the driving time of the fuel pump is within the predetermined period of time (Yes in Step 201), and therefore Step 202 is effected, so that the fuel pump 2 is driven. Thereafter, Step 204 is effected to determine whether or not the engine is stopped. Step 204 corresponds to stop state detecting means for detecting the stop state of the internal combustion engine; that is, in Step 204, in order to detect whether or not the engine is stopped, it is detected whether or not the output signal of the revolution sensor 7 is changed. In this case, Step 203 is not effected yet, and the starter is not started, and therefore the output signal of the revolution sensor 7 is not changed at all. Hence, in Step 204, it is determined that the internal combustion engine is stopped (Yes in Step 204), and the process according to the flow chart of FIG. 2 is ended.

The operating steps indicated in the flow chart of FIG. 2 are repeatedly carried out together with the main routine. When the fuel pump 3 is driven for the predetermined period of time, the fuel line up to the pressure regulator 3 is filled up with fuel. In this case, in Step 201, it is determined that the driving time of the fuel pump 2 is over the predetermined period of time (No in Step 201), and the fuel pump 3 is stopped (Step 203), and the starter (not shown) is started to start the internal combustion engine.

Thereafter, Step 204 is effected. In this case, since the starter has been started, it is determined that the internal combustion engine is not in stop state (i.e., it is in operation) (No in Step 204), and therefore Step 205 is effected to drive the fuel pump 2 again. Thereafter, Step 206 is effected. Step 206 corresponds to start mode detecting means which operates to determine whether or not the internal combustion engine is in a start mode. More specifically, in Step 206, it is determined from the output signal of the revolution sensor 7 whether or not the number of revolutions per minute (rpm) of the internal combustion engine is less than a predetermined value, and, when the rpm is less than the predetermined value, it is determined that the engine is in the start mode. When, in Step 206, it is determined that the engine is not in the start mode, the engine has been normally operated, while the fuel line from the fuel tank 1 to the injector 6 is sufficiently filled with fuel. Hence, the process according the flow chart of FIG. 2 is ended.

Figure 3:
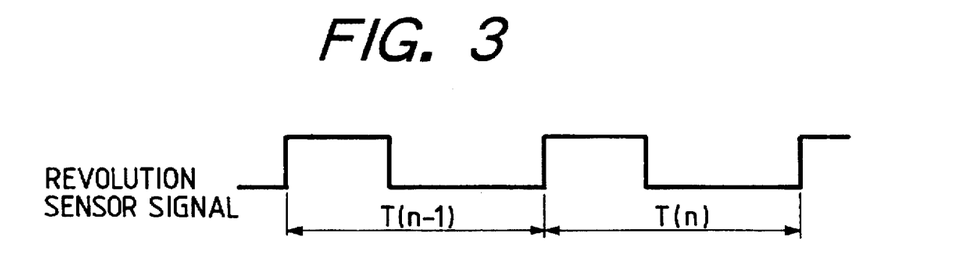
FIG. 3 is a waveform diagram showing the output signal of a revolution sensor employed in the system of the invention.

In the case where it is detected that the rpm of the internal combustion engine is less than the predetermined value, and the engine is in the start mode (Yes in Step 206), Step 207 is effected to determine whether or not the engine is in non-combustion state. Step 207 corresponds to non-combustion state detecting means for determining whether or not the internal combustion engine is in non-combustion state. The non-combustion state detecting means detects the non-combustion state of the internal combustion engine indirectly from a phenomenon which occurs secondarily with the non-combustion state of the engine, such as for instance the fact that the variation in the number of revolutions per minute of the engine is smaller than a predetermined value. FIG. 3 shows the output signal of the revolution sensor 7. The output signal is set to a high level and a low level alternately in correspondence to predetermined crank angles of the internal combustion engine. In FIG. 3, reference character T(n) designates a period which is detected this time; and T(n−1), a period which was detected last time. Those data are measured every rise of the output signal, and stored in the RAM 9a. In Step 207, whether or not the engine is in non-combustion state is determined from the following expression (1):

$$|T(n)-T(n-1)|<T(n-1)\times K1 \tag{1}$$

where K1 is a coefficient for obtaining a threshold value to determine whether or not the number of revolutions per minute of the internal combustion engine is changed, and it is stored as control data in the ROM 9b. In the case where it is detected that the variation in the number of revolutions per minute of the internal combustion engine is less than a predetermined value, it may be estimated that the internal combustion engine is driven at a substantially constant speed (rpm) by the starter, and the internal combustion engine is not driven by itself.

In this case, Step 208 is effected, so that the content (count value) of a decision counter is increased by one (1), and in Step 209 it is determined whether or not the resultant content of the decision counter is equal to or larger than a decision value N1.

When, in Step 209, the count value of the decision counter is less than the decision value N1, the current state of the internal combustion engine may be a transient state which may occur simply temporarily, and therefore Step 210 is effected to drive the injector 6 with an ordinary valve opening time. On the other hand, when the count value is equal to or larger than the decision value N1, it is determined that the internal combustion engine is still in non-combustion state, and therefore Step 211 is effected. In Step 211, the injector 6 is driven with a valve opening time longer than the ordinary valve opening time, to accelerate the discharging of air from the fuel pipe 5. Step 211 corresponds to correcting means which, when the internal combustion engine is in the start mode and in non-combustion state, correctively increases the injector driving time. The corrective increase of the injector driving time is achieved by multiplying an injector opening time which is calculated according to the above-described number of revolutions per minutes, water temperature, and pressure in the intake pipe by a predetermined coefficient, or by adding a predetermined time to the injector opening time thus calculated.

In the case where, air being removed from the fuel pipe 5, the latter 5 has been filled with fuel, the variation in rotation is caused to some extent by the operation of the internal combustion engine. Hence, in Step 207, it is detected that the variation in rotation is large; that is, the engine is not in non-combustion state. As a result, Step 212 is effected to reset the decision counter. When, the decision counter being reset, the count value of the decision counter is smaller than the decision value N1, in Step 209 the result of determination is "No", so that, in Step 210, the injector 6 is driven with the ordinary valve opening time.

Hence, with the above-described first embodiment, even immediately after the automobile has been assembled, the time required for starting the latter is considerably short, which greatly contributes to an improvement in the work efficiency of the automobile assembling line.

Furthermore in the first embodiment, the variation in rotation of the internal combustion engine is detected thereby to indirectly detect the non-combustion state of the latter. Hence, the non-combustion state of the engine can be detected by using the existing sensor of the automobile; that is, the fuel injection control system is simplified in arrangement as much.

Moreover, in the first embodiment, the decision counter is provided, and when the count value of the latter is equal to or larger than the decision value N1, the valve opening time of the injector is correctively increased. Hence, the system of the invention is considerably stable in operation, not responding to the transient state of the engine which may occur simply temporarily.

In addition, in the first embodiment, whenever the key switch is turned on, it is determined whether or not the engine is in the start mode and in non-combustion state. This feature improves the startability of the automobile which has been just assembled, and contributes to an improvement in the startability of the automobile even when it is started again after the fuel has consumed up.

In the above-described first embodiment, in order to fill the fuel line up to the pressure regulator 3 with fuel, Steps 201 through 203 are provided. However, the provision of those Steps is not always necessary; that is, they may be eliminated as the case may be.

In Step 211 corresponding to the correcting means, the injector driving time is multiplied by the predetermined coefficient, or added to the predetermined time; however, the invention is not limited thereto or thereby. That is; all that is required in Step 211, is to drive the injector with the valve opening time longer than the ordinary valve opening time, to accelerate the discharging of the air.

Second embodiment

In the above-described first embodiment, the non-combustion state of the internal combustion engine is detected indirectly from the number of revolutions per minute thereof. On the other hand, in the second embodiment, ion current is utilized to directly detect the non-combustion state of the internal combustion engine.

Figure 4:
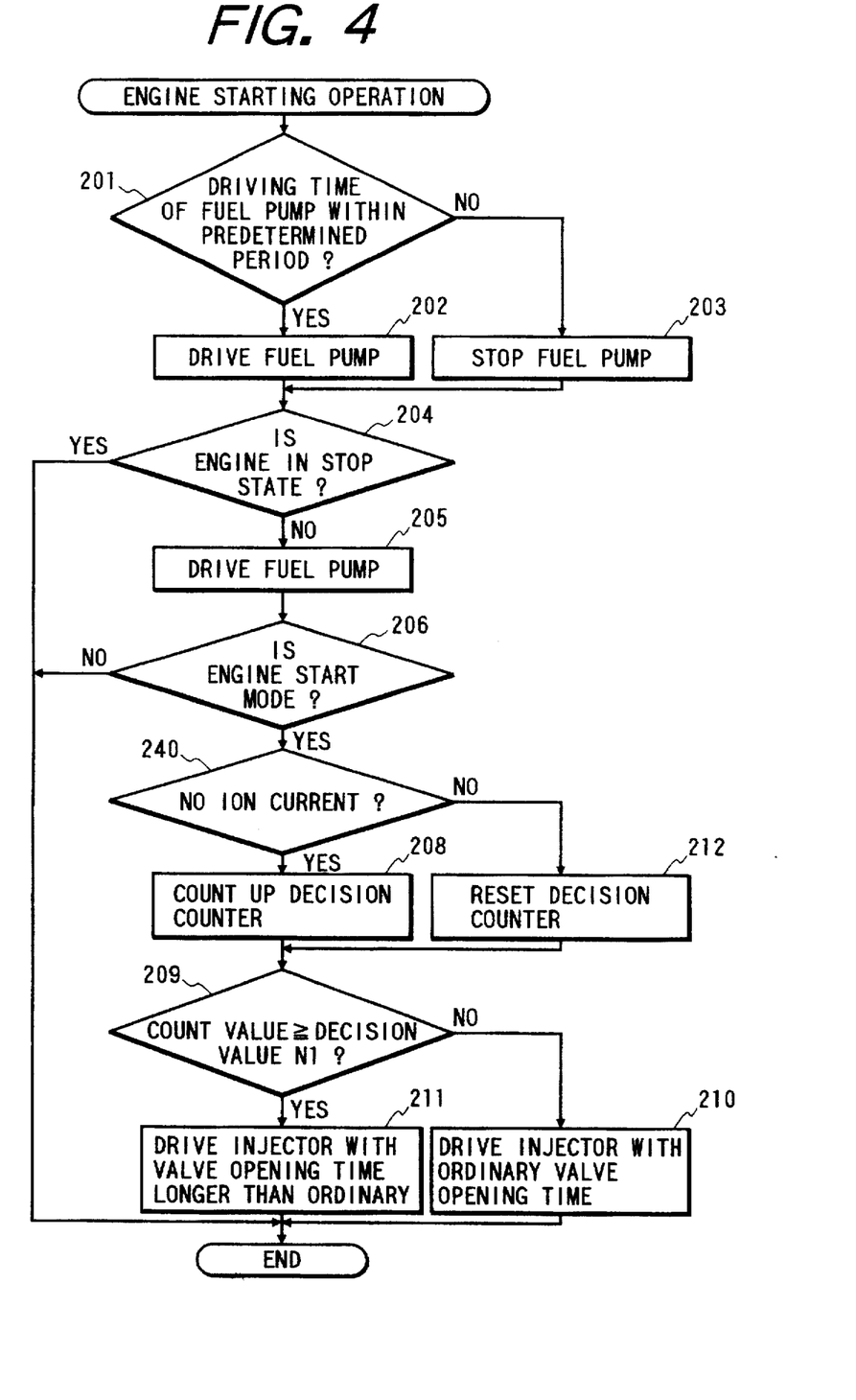
FIG. 4 is a flow chart for a description of the operating steps of operations of another example of the fuel injection control system, which constitutes a second embodiment of the invention.

As was described before, FIG. 4 is for a description of the operating steps of another example of the internal combustion engine fuel injection control system, which constitutes the second embodiment of the invention. As is seen from comparison of FIG. 4 with FIG. 2 (the first embodiment), instead of the non-combustion state detecting means of Step 207 (FIG. 2) is replaced by non-combustion state detecting means of Step 240; that is, the second embodiment is equal to the first embodiment except for a method of detecting the non-combustion state of the engine. Hence, the method will be mainly described here.

An ion current detecting circuit is well known in the art, and therefore its detailed description is not made here.

Ion current flows with the aid of ions (charged atoms) which are generated in the cylinder during combustion of the internal combustion engine. When the internal combustion engine is in non-combustion state, no ions are generated, and accordingly no iron current flows.

In the second embodiment, the ion current is detected, and when the ion current thus detected is less than a predetermined value, it is determined that the engine is in non-combustion state.

As is apparent from the above description, in the second embodiment, the non-combustion state of the internal combustion engine is directly detected from the absence of the ion current. Hence, with the system according to the second embodiment, when compared with the system in which the non-combustion state of the internal combustion engine is detected from the secondary phenomenon such as the variation in rotation thereof, it can be more quickly determined whether or not the engine is in combustion state.

Third Embodiment

In the above-described second embodiment, the non-combustion state of the internal combustion engine is directly detected by use of the ion current. On the other hand, in another example of the internal combustion engine fuel injection control system, which constitutes a third embodiment of the invention, the non-combustion state of the internal combustion engine is directly detected from the pressure in the cylinder thereof.

Figure 5:
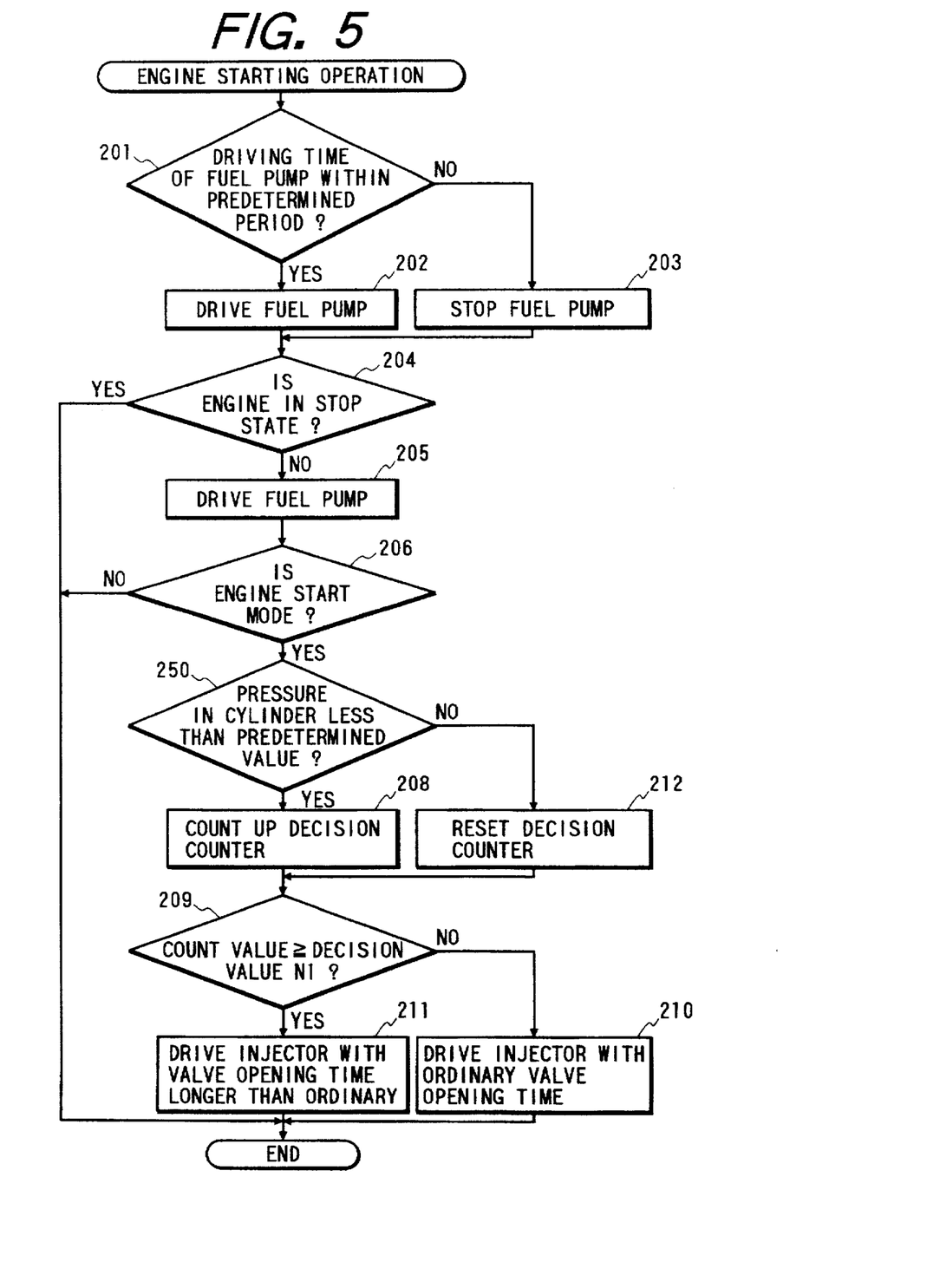
FIG. 5 is a flow chart for a description of the operating steps of another example of the fuel injection control system, which constitutes a third embodiment of the invention.

As was described before, FIG. 5 is for a description of the operating steps of the third embodiment of the invention. As is seen from comparison of FIG. 5 with FIG. 2 (the first embodiment), the non-combustion detecting means of Step 207 (the first embodiment) is replaced with non-combustion detecting means of Step 250; that is, the third embodiment is equal to the first embodiment except for a method of detecting the non-combustion state of the engine. Hence, the method will be mainly described herein.

A circuit which detects the non-combustion state of the engine from the pressure in the cylinder thereof is well known in the art, and therefore its detailed description is not made here.

In an internal combustion engine, mixed gas supplied into the cylinder is compressed by the piston, and under this condition it is ignited into explosion. The pressure in the cylinder is gradually increased until the piston reaches the top dead center, and the pressure is further increased by the explosion.

However, in the case where no explosion occurs in the cylinder because the internal combustion engine is in non-combustion state, the pressure in the cylinder will never become higher than that which is provided when the piston is at the top dead center.

The third embodiment is based on this fact. That is, in the third embodiment, the pressure in the cylinder is detected, and when the pressure thus detected is less than a predetermined value, it is determined that the internal combustion engine is in non-combustion state. In this connection, it goes without saying that the predetermined value is so selected that the pressure in the cylinder reaches it only when the internal combustion engine is in combustion state.

As is apparent from the above description, in the third embodiment, the combustion state of the internal combustion engine is directly detected from the pressure in the cylinder. Hence, with the system according to the third embodiment, when compared with the system in which the non-combustion state of the internal combustion engine is detected from the secondary phenomenon such as the variation in rotation thereof, it can be more quickly and positively determined whether or not the engine is in combustion state.

Fourth Embodiment

In another example of the fuel injection control system, which constitutes a fourth embodiment, the burden in arithmetic operation of the ECU 9 is lessened.

In the first embodiment, whenever the key switch is turned on, the system starts its operation according to the flow chart of FIG. 2, to detect whether or not fuel is present in the fuel pipe 5. However, it is rather troublesome for the system to operate in the above-described manner whenever the key switch is turned on.

In view of the foregoing, in the fourth embodiment, it is eliminated for the system to operate whenever the key switch is turned on, and instead the discharging of air from the fuel pipe is accelerated only in a limited case such as the case where an automobile is to be removed from the automobile assembling line immediately after assembled; that is, the system is simplified in operation as much.

In the fourth embodiment, even after the key switch is turned off, the ECU 9 is kept electrically energized so that the necessary data are maintained stored in the RAM 9a. That is, the fourth embodiment has power supplying means which receives electric power from a battery (not shown) at all times, and forms stable electric power according to the electric power thus received, and supplies it at all times. That is, the power supplying means supplies the stable electric power to the RAM 9a at all times even after the key switch is turned off.

In the fourth embodiment, the power supplying means forms the stable power source by using the battery; however, the invention is not limited thereto or thereby. That is, the power supplying means may be the battery itself.

Figure 6:
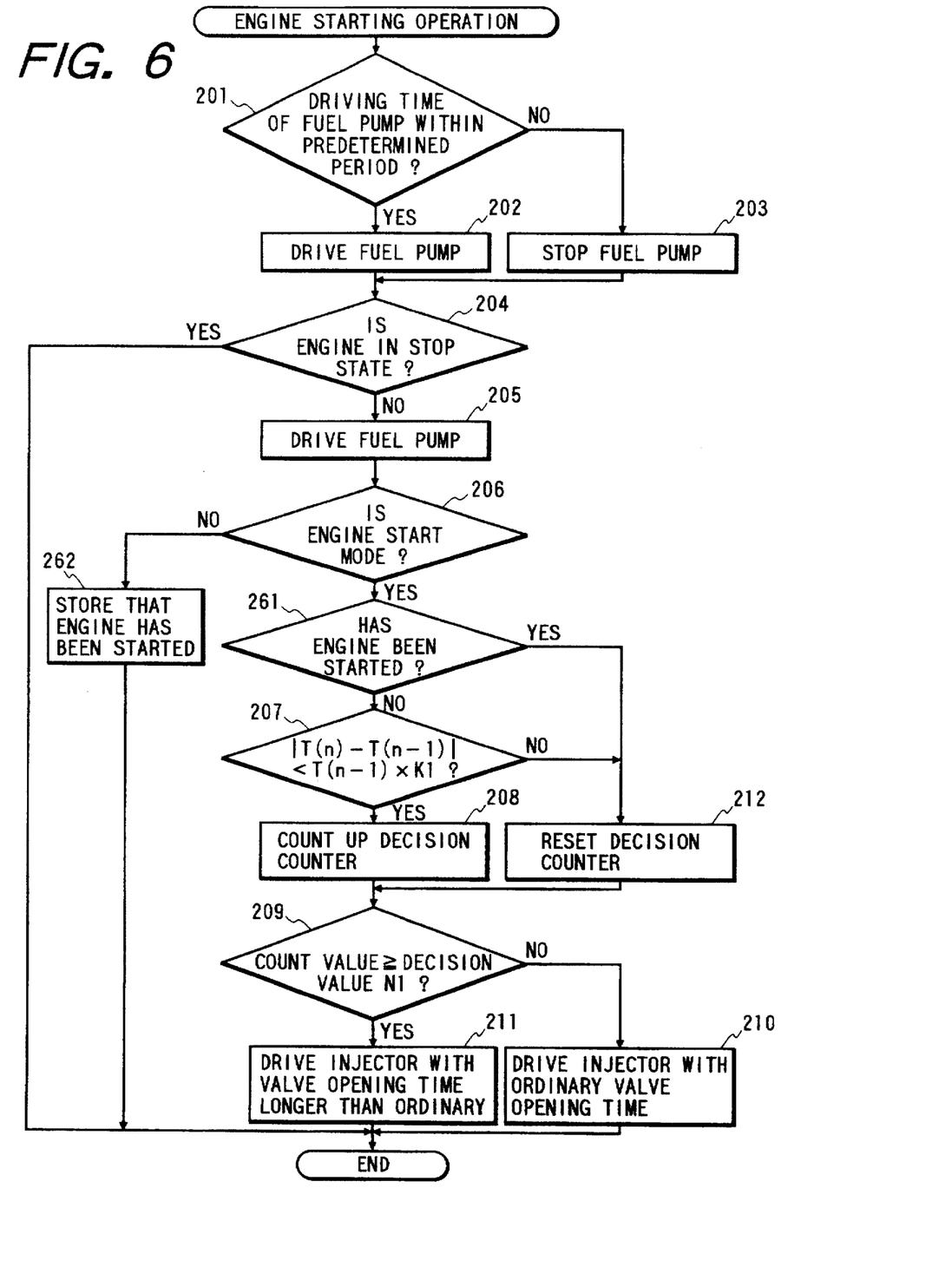
FIG. 6 is a flow chart for a description of the operating steps of operations of another example of the fuel injection control system, which constitutes a fourth embodiment of the invention.

As was described before, FIG. 6 is for a description of the operating steps of the fourth embodiment of the invention. The flow chart of FIG. 6 is obtained by adding Steps 261 and 262 to the flow chart of FIG. 2. That is, the fundamental operation of the fourth embodiment is substantially equal to that of the first embodiment. Therefore, only operations of the fourth embodiment which are not included in those of the first embodiment, will be described hereinafter.

It is assumed that the automobile is started for the first time after assembled. Hence, Steps 201 through 205 in FIG. 6 are successively effected. In Step 206 corresponding to the start mode detecting means, it is determined whether or not the internal combustion engine is in the start mode. When it is determined that the internal combustion engine is in the start mode, Step 261 is effected to determine whether or not the internal combustion engine has ever been started. Since the automobile is started for the first time after assembled, Step 207 is effected, and the above-described operations of the first embodiment are sequentially carried out.

As a result, the air is quickly removed from the fuel pipe 5, and soon the engine is started, and its speed is increased. The operation in Step 206 corresponds to start-completion detecting means. That is, in Step 206, it is detected when the number of revolutions per minute of the internal combustion engine reaches a predetermined value, thereby to determine that the engine has been started. When, in Step 206, it is determined that the engine has been started, Step 262 is effected to store the fact in the RAM 9a that the engine has been started. Thus, the operation of the system according to the flow chart of FIG. 6, is ended.

The RAM 9a is memory means which, receiving electric power even after the key switch is turned off, continuously stores the fact that the engine has been started. This memory means is still kept active when the engine is started next time. Hence, in starting the engine next time, in step 216 it is determined that the engine has been started (Yes in Step 216), and the following operations are omitted; that is, the operation of the system is simplified as much. Step 216 functions as inhibiting means for inhibiting the operation of the correcting means when the fact is stored that the internal combustion engine has been started.

Hence, in the fourth embodiment, when the engine is started for the first time with the fuel pipe 5 filled with air, the discharging of the air from the fuel pipe 5 is accelerated, and the operation of the system is simplified and accordingly achieved at high speed.

As was described above, the fuel injection control system of the invention, comprises: the start mode detecting means for detecting when the internal combustion engine is in the start mode; the non-combustion detecting means for detecting the non-combustion state of the internal combustion engine; and the correcting means for correctively increasing the valve opening time of the fuel injection valve when the internal combustion engine is in the start mode and in the non-combustion state. Hence, the system is able to start the internal combustion engine quickly even when fuel is scarcely present in the fuel flow path.

In the fuel injection control system, according to one aspect of the invention the non-combustion detecting means indirectly detects the non-combustion state of the internal combustion engine. Hence, with the system, the internal combustion engine can be started quickly even when fuel is scarcely present in the fuel flow path. And the system is simple in arrangement.

Furthermore, in the fuel injection control system, according to another aspect of the invention, the non-combustion detecting means directly detects the non-combustion state of the internal combustion engine. In this case, too, the internal combustion engine can be started quickly even when fuel is scarcely preset in the fuel flow path, and the system itself is simple in arrangement.

Moreover, the fuel injection control system further comprises: the start-completion detecting means for detecting when the internal combustion engine has been started; the power supplying means for supplying electric power by utilizing the electric power of a battery even after the power switch is turned off; the memory means for storing the fact, even after the power switch is turned off, that the internal combustion engine has been started, the memory means being kept energized by the power supplying means; and the inhibiting means for inhibiting the operation of the correcting means when the fact has been stored that the internal combustion engine has been started. Hence, the internal combustion engine can be started quickly even when fuel is scarcely present in the fuel flow path, and the system itself is simplified in operation.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A fuel injection control system for an internal combustion engine comprising:

a fuel tank which stores fuel supplied to said internal combustion engine;

a fuel pump which pumps said fuel out of said fuel tank;

fuel pressure regulating means for regulating a pressure of said fuel supplied from said fuel pump;

a pressurized fuel flow path with a first end connected to said fuel pressure regulating means, for supplying said fuel to said internal combustion engine;

a fuel injection valve which is connected to a second end of said fuel flow path, for injecting fuel into said internal combustion engine;

start mode detecting means for detecting when said internal combustion engine is in a start mode;

non-combustion detecting means for detecting a non-combustion state of said internal combustion engine; and correcting means for rapidly expelling air from said pressurized fuel flow path by correctively increasing the valve opening time of said fuel injection valve when said internal combustion engine is in the start mode and in the non-combustion state.

2. A fuel injection control system as claimed in claim 1, wherein said non-combustion detecting means further comprises a means for indirectly detecting the non-combustion state of said internal combustion engine.

3. A fuel injection control system as claimed in claim 1, wherein said non-combustion detecting means further comprises a means for directly detecting the non-combustion state of said internal combustion engine.

4. A fuel injection control system for an internal combustion engine comprising:

a fuel tank which stores fuel supplied to said internal combustion engine;

a fuel pump which pumps said fuel out of said fuel tank;

fuel pressure regulating means for regulating a pressure of said fuel supplied from said fuel pump;

a fuel flow path with a first end connected to said fuel pressure regulating means, for supplying said fuel to said internal combustion engine;

a fuel injection valve which is connected to a second end of said fuel flow path, for injecting fuel into said internal combustion engine;

start mode detecting means for detecting when said internal combustion engine is in a start mode;

non-combustion detecting means for detecting a non-combustion state of said internal combustion engine;

correcting means for correctively increasing the valve opening time of said fuel injection valve when said internal combustion engine is in the start mode and in the non-combustion state;

start-completion detecting means for detecting when said internal combustion engine has been started;

power supplying means for supplying electric power by utilizing the electric power of a battery even after a power switch is turned off;

memory means for storing a data item indicating that said internal combustion engine has been started, even after said power switch is turned off, said memory means being kept energized by said power supplying means; and inhibiting means for inhibiting the operation of said correcting means when said data item has been stored indicating that said internal combustion engine has been started.

5. A method of controlling a fuel injection device for an internal combustion engine comprising a fuel tank which stores fuel supplied to said internal combustion engine, a fuel pump which pumps said fuel out of said fuel tank, fuel pressure regulating means for regulating the pressure of fuel supplied from said fuel pump, a pressurized fuel flow path having a first end connected to said fuel pressure regulating means, for supplying said fuel to said internal combustion engine, and a fuel injection valve which is connected to a second end of said pressurized fuel flow path, for injecting fuel into said internal combustion engine, said controlling method comprising the steps of:

- detecting when said internal combustion engine is in a start mode;
- detecting a non-combustion state of said internal combustion engine; and
- rapidly expelling air from said pressurized fuel flow path by correctively increasing the valve opening time of said fuel injection valve when said internal combustion engine is in the start mode and in the non-combustion state.

6. A method of controlling a fuel injection device for an internal combustion engine comprising a fuel tank which stores fuel supplied to said internal combustion engine, a fuel pump which pumps said fuel out of said fuel tank, fuel pressure regulating means for regulating the pressure of fuel supplied from said fuel pump, a fuel flow path having a first end connected to said fuel pressure regulating means, for supplying said fuel to said internal combustion engine, and a fuel injection valve which is connected to a second end of said fuel flow path, for injecting fuel into said internal combustion engine; said controlling method comprising the steps of:

- detecting when said internal combustion engine is in a start mode;
- detecting a non-combustion state of said internal combustion engine;
- correctively increasing the valve opening time of said fuel injection valve when said internal combustion engine is in the start mode and in the non-combustion state;
- detecting starting of said internal combustion engine;
- supplying electric power of a battery even after a power switch is turned off;
- storing and keeping a data item indicating that said internal combustion engine has been started, even after said power switch is turned off; and
- inhibiting the operation of said correcting step when said data item has been stored that said internal combustion engine has been started.

* * * * *